Oct. 9, 1923.

B. COOPER

CLUTCH MECHANISM

Filed May 6, 1920

1,470,321

WITNESSES
Guy M. Spring
S. M. McColl,

Inventor
BERT COOPER

By Richard B. Owen
Attorney

Patented Oct. 9, 1923.

1,470,321

UNITED STATES PATENT OFFICE.

BERT COOPER, OF ALBUQUERQUE, NEW MEXICO.

CLUTCH MECHANISM.

Application filed May 6, 1920. Serial No. 379,310.

*To all whom it may concern:*

Be it known that I, BERT COOPER, a citizen of the United States, residing at Albuquerque, in the county of Bernalillo and State of New Mexico, have invented certain new and useful Improvements in Clutch Mechanism, of which the following is a specification.

This invention relates to a clutch mechanism in motor vehicle fire engine apparatus.

The main object of the invention is to provide a device of this character so constructed that the pump can be started on low gear and fill the hose line slowly, thereby protecting the nozzle men from the danger incident to the rushing of a heavy volume of water through the hose which is obstructed when it reaches the nozzle.

Another object is to provide such a device, which after the hose is slowly filled the proper gear may be selected to increase the flow of the water through the hose depending on whether the pump is working at straight suction, hydrant pressure or with one or more lines of hose.

Another object is to so construct such a device that a small motor may be used in connection therewith and produce a greater volume of water at a wider range of operation than the heavy high powered machines, which are confined to one pump speed.

Another object is to provide such a device which may be successfully used with light, low powered engines, thus making it possible for all small towns to have excellent fire protection at low cost.

Another object is to provide such an attachment for a motor fire engine that it may be readily operated by the driver from his seat to throw the pump into and out of operation and to throw in the rear transmission to render the car ready to be driven on the road in the usual manner.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

Figure 1:
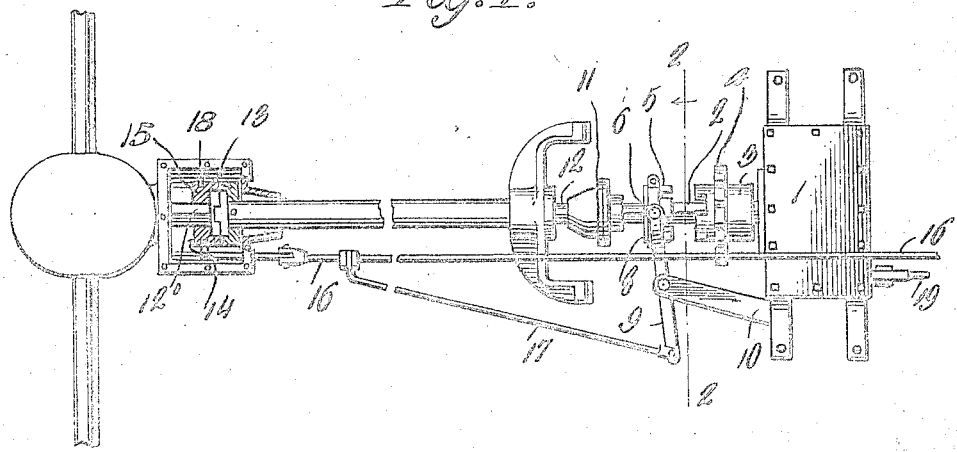
Figure 2:
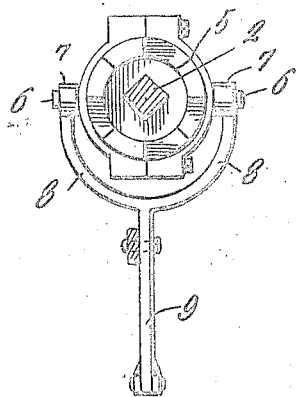

In the accompanying drawings:

Fig. 1 represents a top plan view of the attachment constituting this invention; and Fig. 2 is a transverse section taken on the line 2—2 of Fig. 1.

In the embodiment illustrated a front transmission 1 is shown which is of the usual type and is designed to be located at the rear of the engine in the ordinary manner. This transmission is equipped with three or more speeds, and the only difference between it and the one ordinarily employed is that the main drive shaft 2 projects through the rear of the transmission case further than it ordinarily does, and has mounted thereon a clutch member 3 carrying a sprocket 4. This clutch member 3 is mounted loosely on a cylindrical portion of the shaft 2 and is held against longitudinal movement by any suitable means, such as a collar or the like. The shaft 2 in rear of the clutch member 3 is preferably made angular and has mounted to slide thereon a cooperating clutch member 5, which when shifted forward is designed to connect with the member 3 and thus unite said member with shaft 2, causing it to drive the sprocket wheel 4 and transmit motion from the shaft to the pump by means not shown.

The sliding clutch member 5 has studs or journals 6 projecting radially therefrom at diametrically opposite points with which is engaged bearings 7 carried by furcations 8 of the lever 9. This lever 9 is fulcrumed intermediately of its ends on a supporting bracket 10, which is secured to the chassis or to any other stationary part of the machine.

A universal joint 11 connects the rear end of the shaft 2 with the driven or propeller shaft 12 with which the rear transmission 13 is designed to be connected by a clutch 14, one member 15 of which is mounted to slide on shaft 12' and to rotate therewith, said member being connected with the sliding clutch member 5 through rods 16 and 17 and the lever 9, as is shown clearly in Fig. 1, so that when the lever is rocked to throw the clutch member 5 into engagement with member 3, the member 15 of the clutch 14 will be disengaged from its cooperating member 18, and thereby throw out the rear transmission 13, permitting the pump to be operated by the vehicle engine without affecting the driving wheels of the vehicle.

The rod 16, which is connected with clutch member 15 extends to a point near the seat of the driver for convenient operation by him, so that a forward pull thereon will connect clutch members 15 and 18 and will disconnect clutch members 5 and 3 and a rearward push on said rod will have the reverse effect connecting clutch members 5 and 3 and disconnecting clutch members 15 and 18.

The usual control rod for the transmission 1 is shown at 19, being broken off for convenience in illustration.

In the use of this device, it will be obvious that after clutch members 5 and 3 have been connected for actuating the pump the driver may throw the engine in low gear and thus start the pump and fill the hose line slowly and after the line has been filled the operator may select the speed from the transmission 1 that is required for the occasion, which may be first, second, third or fourth in the same manner that the speed is changed when the car is being driven over the road.

When through pumping all that is necessary is to shift rod 16 in the opposite direction to disconnect the clutch members 5 and 3 and to connect up the clutch members 15 and 18, whereby, the rear transmission will be engaged with the driving shaft and the car is ready to be driven over the road in the usual manner.

By referring to a table of water volumes and pressures it will be found that a pump is compelled to operate at a wide range of speed, and this device is thus particularly applicable to such pumps.

From the foregoing description, taken in connection with the accompanying drawings, the advantages of the construction and the method of operation will be readily apparent to those skilled in the art to which the invention appertains and while I have described the principle of operation of the invention together with the device which I now consider to be the best embodiment thereof, I desire to have it understood that the device shown is merely illustrated and that such changes may be made as are within the scope of the claimed invention.

What is claimed is:—

A device as set forth including a transmission equipped with a drive shaft a portion of which is circular in cross section and a portion rectangular in cross section, a clutch element mounted on said circular portion of the shaft, and a cooperating clutch element mounted on the rectangular portion of the shaft, a driven shaft operatively connected to said drive shaft and equipped with a two-part clutch, and interconnected members engaged with the clutch element of the rectangular portion of the drive shaft and with one of the clutch elements of the driven shaft to connect one of the clutches and disconnect the other clutch with a single movement of said interconnected members.

In testimony whereof I affix my signature in presence of two witnesses.

BERT COOPER.

Witnesses:
 L. H. LITTLE,
 B. F. POOLE.